United States Patent Office

2,699,398
Patented Jan. 11, 1955

2,699,398

OPHTHALMIC GLASS

William H. Armistead, Corning, N. Y., assignor to Corning Glass Works, Corning, N. Y., a corporation of New York No Drawing. Application February 18, 1952,
Serial No. 272,243

5 Claims. (Cl. 106—53)

This invention relates to glasses having refractive indices ($n_D$) in the neighborhood of 1.63 to 1.66 and dispersive indices (V) of about 40 together with sufficiently low softening points and sufficiently high chemical durability and resistance to devitrification for utilization as the high-index segments in multifocal ophthalmic lenses.

In the production of multifocal lenses such as bifocal lenses, it is customary to utilize a button or segment having a softening point 40 to 50° C. lower than that of the crown so that the segment can soften and fuse to the crown without destroying the curvature that has been ground into the crown. For the ordinary standard white optical or hard crown glasses, which generally have a softening point of about 725 to 730° C., various button glasses having the desired lower softening point are readily available.

Many of the recently introduced tinted crown glasses have considerably lower softening points, however, the softening points of certain greenish crown glasses being as low as 670° C.; and previously existing glasses have not been entirely satisfactory for use in bifocal segments for many of these tinted glasses in that, generally, either the softening point spread is not sufficient or such previous glass does not possess the requisite physical characteristics, especially where a refractive index of about 1.63 to 1.66 and a dispersive index of about 40 (approximately 38 to 42) are required. As a matter of fact, so so far as applicant is aware, there has not been heretofore available a glass having refractive and dispersive indices within the indicated ranges and also having a sufficiently low softening point for use as a button glass with the above-mentioned green-tinted crown glasses.

The indicated physical characteristics together with a reasonably low softening point can be obtained, for example, in certain prior barium and barium flint glasses. Such glasses, however, exhibit a marked tendency to devitrify during the remolding operation necessary in the production of bifocal lenses. To eliminate such devitrification, it is customary to include in the glass composition a substantial amount of CaO, which has the undesirable effect, however of raising the softening point.

Lowering of the softening point of such a glass can be accomplished by increasing the proportion of fluxes such as PbO, alkali metal oxides, and $B_2O_3$. Such a change in the glass composition, however, adversely affects its acid durability, which should be sufficient so that the glass is not spotted by weak acids such as those found in grapefruit.

Bifocal segments and lenses containing the same are conventionally washed with alkaline solutions for removal of the pitch utilized in attaching them to blocks for polishing, and the alkali durability of button glasses should thus be sufficient to enable them to withstand any alkaline attack during such treatment. To insure this resistance, $ZrO_2$ is usually added to the glass composition in substantial amount. Such addition, however, also tends to raise the softening point objectionably.

I have now discovered that these oxides, with the exclusion of CaO, can nevertheless be so compounded and balanced as to yield glasses which have the desired physical and chemical properties and which are particularly suitable for the production of bifocal segments for use with the softer crown glasses. These new glasses are free from calcium and comprise essentially 31 to 41% $SiO_2$, 18 to 33% PbO, 12 to 25% BaO, the total PbO and BaO being 40 to 50%, 5 to 10% $ZrO_2$, at least one alkali metal oxide in the indicated proportion selected from the group consisting of up to 8% $K_2O$, up to 9% $Na_2O$ and up to 2.5% $Li_2O$, the selected alkali metal oxide including at least one oxide selected from the group consisting of $Na_2O$ and $Li_2O$, the total of the alkali metal oxides being 6 to 9%, and 3 to 6% $B_2O_3$, the total of the essential constituents being at least 98%. If desired, up to 2% $TiO_2$ may be included for the purpose of raising the refractive index of the glass.

The following compositions calculated in percent by weight from their respective batches will further illustrate the invention:

|  | 1 | 2 | 3 | 4 | 5 | 6 | 7 | 8 |
|---|---|---|---|---|---|---|---|---|
| $SiO_2$ | 37 | 36.5 | 39.2 | 40 | 38.1 | 38.5 | 37 | 33.8 |
| PbO | 22.7 | 24 | 30 | 25 | 20 | 30.2 | 22 | 24.7 |
| BaO | 22 | 22 | 15 | 15 | 20 | 15 | 22 | 22 |
| $ZrO_2$ | 7 | 7.3 | 5.2 | 5 | 7 | 5.2 | 7 | 7 |
| $K_2O$ | ---- | 2 | ---- | ---- | ---- | ---- | 6 | 7 |
| $Na_2O$ | 6.8 | 4.7 | 6.1 | 9 | 7.9 | 7.1 | 2 | ---- |
| $Li_2O$ | ---- | ---- | 0.5 | ---- | ---- | ---- | ---- | 1.5 |
| $B_2O_3$ | 3.5 | 3.5 | 4 | 5 | 5 | 4 | 4 | 4 |
| $TiO_2$ | 1 | ---- | ---- | 1 | 2 | ---- | ---- | ---- |
| $n_D$ | 1.660 | 1.659 | 1.653 | 1.637 | 1.652 | 1.652 | 1.647 | 1.660 |
| V | 40.4 | 40.7 | 39.7 | 40.9 | 40.9 | 39.3 | 42 | 40.5 |
| Softening Point, °C | 665 | 676 | 620 | 635 | 665 | 635 | 689 | 666 |

A fining agent such as $As_2O_3$, $Sb_2O_3$ or $Na_2SO_4$ preferably is added to the batches for the above glasses in an amount ranging from 0.1 to 0.5% of the finished glasses on the oxide basis, but such amounts have substantially no effect upon the physical and chemical properties of the glasses. Unavoidable traces of impurities such as $Fe_2O_3$, MgO and CaO may also be present without substantial effect on the properties of the glasses.

Variations in the proportions of the essential constituents of the present glasses should be confined within the limits set forth above for the following reasons:

An excess of $SiO_2$ in the glass raises its softening point and lowers its refractive index objectionably while a deficiency of $SiO_2$ causes the glass to have too low an acid durability.

An excess of PbO likewise lowers the acid durability of the glass too much and also its dispersive index while a deficiency of PbO raises the softening point and lowers the refractive index. An excess of BaO causes devitrification of the glass and raises its softening point objectionably and a deficiency of BaO makes the dispersive index of the glass too low. If the total PbO and BaO exceeds about 50% the acid durability of the glass will be lower than than desirable but if such total is less than about 40% the refractive index will be undesirably low.

An excess of $ZrO_2$ will fail to dissolve or will precipitate in the glass but at least 5% is essential to maintain suitable alkali durability.

At least 6% total alkali metal oxide is required to prevent the softening point of the glass from being too high and its expansion coefficient from being too low but such total should not amount to more than about 9% in order to avoid too high an expansion coefficient or too low an acid durability. It is preferable to use $Na_2O$ because it is cheaper and has a better fluxing power than $K_2O$. Glasses containing little or no $Na_2O$, however, advantageously contain $Li_2O$ to offset the lower fluxing power of $K_2O$.

An excess of $B_2O_3$ lowers the acid durability of the glass objectionably while a deficiency of $B_2O_3$ results in a tendency towards too high a softening point and too low a dispersive index. The dispersive index is also undesirably lowered by an excess of $TiO_2$.

The presence of alkaline earth metal oxides other than BaO, and particularly those of low molecular weight such as MgO and CaO, is to be avoided except as trace impurities on account of their undesirable effect on the softening point and acid durability of the present glass.

Finally, the total of the essential ingredients should be at least 98% in order to provide sufficient acid durability.

The above-described ophthalmic glasses may if desired be tinted by including therein suitable glass coloring oxides. Glasses of this type which are colored green to match the green tinted crown glass are described in my pending application Serial No. 272,244 filed concurrently herewith.

As used herein, the softening point of a glass is that temperature at which the glass has a viscosity in the neighborhood of $4.5 \times 10^7$ poises.

What I claim is:

1. A calcium-free glass comprising essentially by weight 31 to 41% $SiO_2$, 18 to 33% PbO, 12 to 25% BaO, the total PbO and BaO being 40 to 50%, 5 to 10% $ZrO_2$, at least one alkali metal oxide in the indicated proportion selected from the group consisting of up to 8% $K_2O$, up to 9% $Na_2O$ and up to 2.5% $Li_2O$, the selected alkali metal oxide including an oxide selected from the group consisting of $Na_2O$ and $Li_2O$, the total of the alkali metal oxides being 6 to 9%, and 3 to 6% $B_2O_3$, the total of the essential constituents being at least 98%.

2. A calcium-free glass comprising essentially by weight 31 to 41% $SiO_2$, 18 to 33% PbO, 12 to 25% BaO, the total PbO and BaO being 40 to 50%, 5 to 10% $ZrO_2$, at least one alkali metal oxide in the indicated proportion selected from the group consisting of up to 8% $K_2O$, up to 9% $Na_2O$ and up to 2.5% $Li_2O$, the selected alkali metal oxide including an oxide selected from the group consisting of $Na_2O$ and $Li_2O$, the total of the alkali metal oxides being 6 to 9%, 3 to 6% $B_2O_3$, the total of the essential constituents being at least 98%, and up to 2% $TiO_2$.

3. A glass composition consisting essentially by weight of 31 to 41% $SiO_2$, 18 to 33% PbO, 12 to 25% BaO, the total PbO and BaO being 40 to 50%, 5 to 10% $ZrO_2$, at least one alkali metal oxide in the indicated proportion selected from the group consisting of up to 8% $K_2O$, up to 9% $Na_2O$ and up to 2.5% $Li_2O$, the selected alkali metal oxide including an oxide selected from the group consisting of $Na_2O$ and $Li_2O$, the total of the alkali metal oxides being 6 to 9%, 3 to 6% $B_2O_3$, and up to 2% $TiO^2$.

4. A glass having approximately the following composition by weight:

| | Percent |
|---|---|
| Silica ($SiO_2$) | 37 |
| Lead oxide (PbO) | 22.7 |
| Barium oxide (BaO) | 22 |
| Zirconium oxide ($ZrO_2$) | 7 |
| Sodium oxide ($Na_2O$) | 6.8 |
| Boric oxide ($B_2O_3$) | 3.5 |
| Titanium oxide ($TiO_2$) | 1 |

5. A glass having approximately the following composition by weight:

| | Percent |
|---|---|
| Silica ($SiO_2$) | 38.5 |
| Lead oxide (PbO) | 30.2 |
| Barium oxide (BaO) | 15 |
| Zirconium oxide ($ZrO_2$) | 5.2 |
| Sodium oxide ($Na_2O$) | 7.1 |
| Boric oxide ($B_2O_3$) | 4 |

References Cited in the file of this patent

UNITED STATES PATENTS

| 2,523,266 | Armistead | Sept. 26, 1950 |
| 2,606,841 | Armistead | Aug. 12, 1952 |

OTHER REFERENCES

"Rx Lenses," American Optical Company Catalog, page 64, published in 1950.